UNITED STATES PATENT OFFICE.

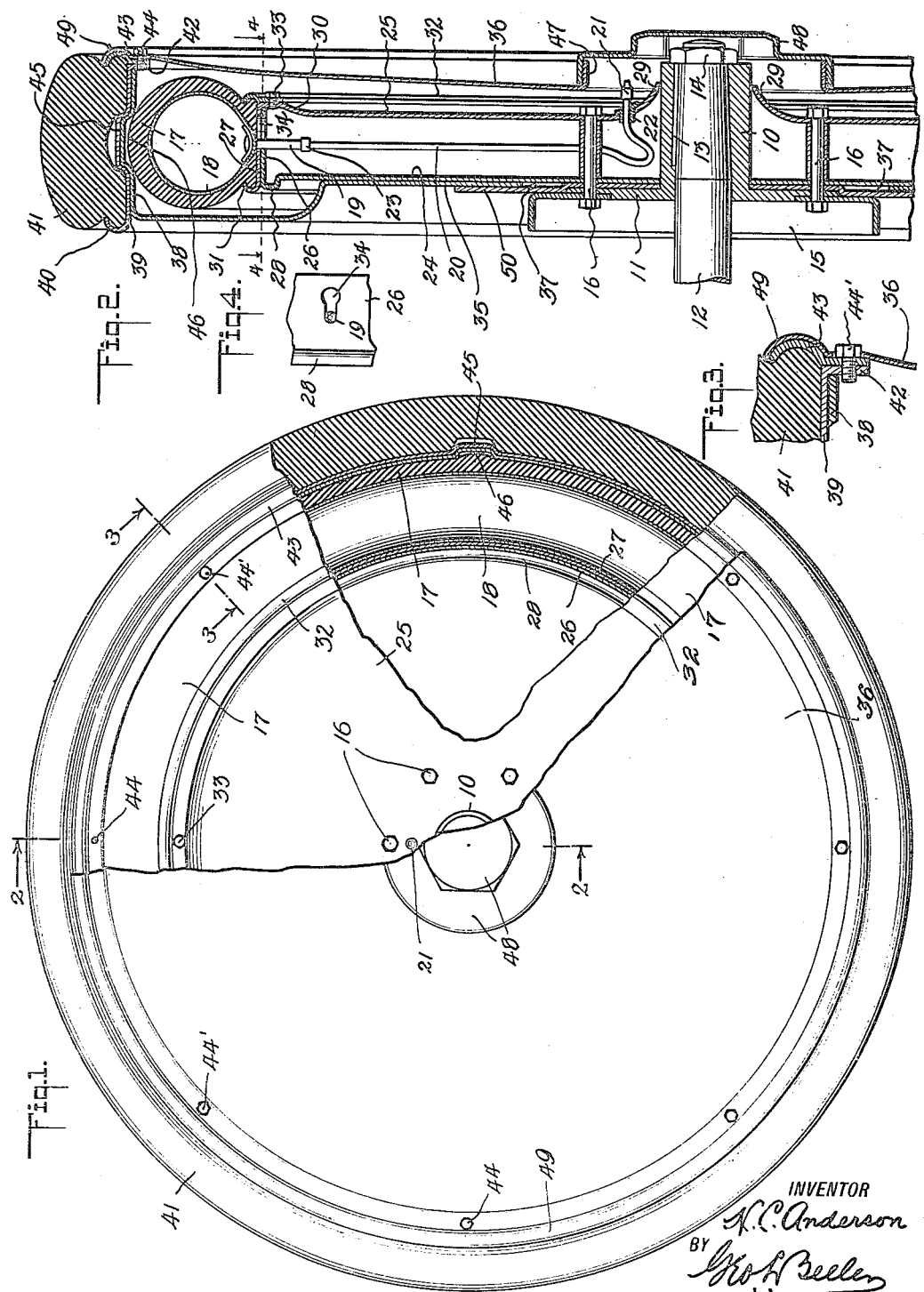

HIRAM C. ANDERSON, OF NEW YORK, N. Y.

RESILIENT WHEEL.

1,425,623.　　　　　Specification of Letters Patent.　　Patented Aug. 15, 1922.

Application filed July 25, 1921. Serial No. 487,282.

*To all whom it may concern:*

Be it known that I, HIRAM C. ANDERSON, a citizen of the United States, residing at the city of New York, borough of the Bronx, in the county of Bronx and State of New York, have invented certain new and useful Improvements in Resilient Wheels, of which the following is a specification.

This invention relates to resilient wheels, and has particular reference to wheels in which there is provided a cushioning means of the nature of the commonly used pneumatic tire.

Among the objects of the invention is to provide a wheel structure within which is embodied a pneumatic element and so designed as to afford the maximum degree of protection to the tread, from shocks, friction, and other unfavorable conditions.

Another object is to provide a wheel the tread portion of which with respect to contour and easy running conditions, is equivalent to any ordinary solid wheel or one equipped with a solid rubber tire, and yet a wheel in which the pneumatic element is so arranged as to make it possible for it to be relatively soft for the sake of maximum resiliency, comfort to the passengers, and relief to the vehicle and running mechanism with respect to shocks or strains, rendering it much cheaper for the matter of fuel, lubricating oil, and other conditions, than is usual for the running and maintenance of the vehicle.

A further object of the invention is to provide a structure in which there is the least possibility of generation of heat, and which if generated will be dissipated without any danger of injury to the construction or deterioration of any of the more delicate parts of the mechanism.

Another object of the invention is to provide a wheel having every favorable qualification as to strength, durability, and appearance that is inherent in any standard pneumatic wheel, and yet one that may be easily and cheaply manufactured as well as conveniently kept in running condition.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a preferred embodiment of this invention, parts being in vertical section.

Fig. 2 is a vertical transverse section of the same on the line 2—2 of Fig. 1.

Fig. 3 is a transverse sectional detail on the line 3—3 of Fig. 1.

Fig. 4 is a fragmentary detail approximately on the line 4—4 of Fig. 2.

Referring now more specifically to the drawings I show my improved wheel as comprising essentially a wheel within a wheel, the inner wheel being protected by the outer wheel as a casing or shell. 10 indicates any convenient or conventional form of hub, shown however as having a disk like flange 11 carried by its inner end, the hub being detachably fixed to an axle 12 by any suitable means, such as a key 13 and nut 14. To the flange is shown secured a brake drum 15 as by means of bolts 16.

The aforesaid inner wheel includes any suitable resilient member such as a pneumatic tire 17 having an inflatable inner tube 18 to which is attached a filling tube 19 of any suitable construction.

20 indicates a long flexible extension of the tube 19, the same projecting laterally outward near the hub and closed normally by means of a cap 21. This flexible tube is held in place by means of a thimble 22 but through which it may be drawn outward if necessary. These two tubes are detachably connected by means of a coupling 23 within the inner wheel.

The main portion of the inner wheel comprises two disks 24 and 25 stamped, pressed, or otherwise formed from sheet material such as steel, and each provided with a peripheral flange, 26 and 27, the latter snugly embracing the former, making double strength at the periphery. Between the main portion of the disk 24 and its flange is a laterally extending annular bead 28, while the outer edge portion of the flange 26 is plain or cylindrical. The main portion of the disk 25 is flat, but it is flared outward toward the outer end of the hub at 29, and to a less degree near the periphery at 30. The flange portion 27 of this disk is bent outward forming a clincher at 31 to embrace one side of the tire 17. The other side of the tire is embraced by a detachable flange 32 secured to the peripheral portion of the disk 25 by any suitable means such as a series of bolts 33. To attach or detach the tire 17 from the inner wheel it is necessary only to remove the flange 32. The mating flanges 26 and 27 are provided with registering key hole slots 34 through which the tube 19 projects, and out through which the coupling end 23 of the tube may be drawn and removed through the larger end of the slot, the flexible extension 20 being long enough for this purpose and to permit inflation of the tire or access thereto for other purposes without disturbing the inner end portion of said extension. It will thus appear that the inner wheel structure because of the multiplicity of flanges at its periphery, is exceedingly strong and rigid in proportion to the weight of material.

The outer wheel or casing comprises inner and outer disks 35 and 36. The disk 35 comprises a flat central portion spaced outward at 37 from the hub and having at its periphery a flange portion 38 of generally cylindrical form around which is gripped a tire holding rim 39 also of generally cylindrical form but having along one edge a clincher 40 for one side of any suitable form or type of tread tire 41, and having along its other edge an inwardly projecting flange 42. The outer side of the tire 41 is gripped in place by means of a detachable flange 43 held to the flange 42 by means of a series of bolts 44 and 44'. The mating flanges 38 and 39 after being assembled in the factory are locked permanently together by any suitable means, as for example, by swaging them outward as shown at 45 forming a series of cups which serve the additional function of vacuum spaces into which the adjacent portions 46 of the pneumatic tire 17 are forced at the time of inflation thereof, and so the flanges are not only held rigidly together as a unitary structure but the two wheels are thereby insured against relative rotation. The outer disk 36 in the main is approximately flat but at its center is provided with an outwardly projecting collar 47, externally threaded to receive a dust cap 48, while at its periphery the disk 36 is provided with a curved flange 49 embracing the detachable gripper flange 43. The bolts 44, which preferably alternate with the bolts 44', extend through the disk 36 as well as the flanges 42 and 43, the heads thereof bearing squarely against the outer surface of the disk 36 whereby the disk is locked in place. For the bolts 44', however, the disk 36 is provided with holes taking freely over the heads of the bolts as shown in Fig. 3. Thus as shown the four bolts 44 hold the disk 36 in place, while all eight of the bolts 44 and 44' hold the flange 43 in place. If the holes through the disk for the heads of these bolts conform to such heads they will serve as keepers to prevent accidental loosening of the bolts 44'. To remove the disk 36, however, it is necessary to remove only the four bolts 44, while the other four bolts remain in place, maintaining the established position of the rim or flange 43. Hence to obtain access to the pneumatic tire 17 no part of the outer wheel or shell, except the disk 36, need be disturbed. Access may be had to the cap 21 for inflation of the tire by simply removing the dust cap 48, but as above intimated, the extension 20 may remain in place and the inner tube and its nipple 19 may be removed through the key hole slot 34 upon removal of the flange 32.

The side of the disk 35 opposite the disk 24 is embraced by hub disk 50, the diameter of which is sufficient to reinforce and strengthen the disk 35 throughout all of its radial movements. The inner and outer wheels are normally held concentric by virtue of the inflation of the inner tire, but when a load or shock is brought upon the axle it and its hub to which the inner wheel is fixed will be displaced radially as may be permitted within the scope of the clearance 37. I wish to point out at this time, however, that because the pneumatic tire is thoroughly housed and protected within the outer wheel or casing, it may be kept in a much softer or more deflated condition than that in which pneumatic tires must ordinarily be run. In other words, my improved wheels will run or roll easily by reason of the fact that the treads thereof are relatively rigid and perfectly circular, while the pneumatic portion of the wheel may be kept relatively soft for maximum comfort and resiliency. Again, the heat ordinarily generated in rubber tires is mainly at the tread, and such heat received by or stored in the usual pneumatic tire is exceedingly injurious, causing the same to deteriorate much more rapidly than is necessary so far as the strain or load brought to bear thereon is concerned. By my construction, however, any heat incident to sunlight, friction, or other causes is received by and is dissipated from the tread portion of the wheel and without affecting the pneumatic portion thereof. Thus my wheels are practically indestructible, and as a result of extensive experiments therewith, I may state that the trouble and expense incident to the provision of spare tires or wheels are unnecessary, and so the nice lines of the vehicle are not disturbed.

I claim:

1. In a resilient wheel, the combination of an external rim including a cylindrical member provided with a series of cups, and inwardly projecting dust excluding members, one of which comprises a flange mating with said cylindrical rim member and having cups interlocking with the cups aforesaid, and an inner wheel structure comprising a hub, a body portion comprising a pair of disks, and a cushion supported upon the peripheral portion of the disks and adapted for relative radial movement with respect to the dust excluding members aforesaid, the cushion having direct cooperation with the series of cups aforesaid to prevent relative circumferential movement between the parts.

2. In a resilient wheel, an inner wheel comprising a pair of disks with telescoping outer flanges constituting a rim having registering holes, a hub to which said disks extend, an outer rim spaced from the inner rim, a pneumatic cushion in the space between the rims, and filling means for the cushion comprising a short valve stem projecting through the flange holes aforesaid, and a flexible tube extending from the valve stem through an opening in one disk near the hub, the tube being of sufficient length to permit its being drawn outward through the flange holes so that the valve stem may be detached therefrom.

3. The combination of a wheel within a wheel, the inner wheel comprising a pneumatic tire, and the outer wheel comprising a rigid tread portion having direct gripping co-operation with the tire and comprising a pair of mating rim members having means interlocking them together, and also including a pair of disk members inclosing the inner wheel, one of which is removable to afford access to the inner wheel without disturbing otherwise the outer wheel, the tread portion of the outer wheel comprising a clincher rim structure and a removable side flange, a tire gripped by said structure, and a series of bolts acting to hold said side flange, while a portion only of the flange holding bolts serve to attach the removable outer wheel disk.

In testimony whereof I affix my signature.

HIRAM C. ANDERSON.